United States Patent
Scofield et al.

(10) Patent No.: US 10,229,120 B1
(45) Date of Patent: Mar. 12, 2019

(54) GROUP CONTROL OF NETWORKED MEDIA PLAY

(75) Inventors: Christopher L. Scofield, Seattle, WA (US); Luan K. Nguyen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2529 days.

(21) Appl. No.: 12/188,488

(22) Filed: Aug. 8, 2008

(51) Int. Cl.
*G06F 17/30* (2006.01)

(52) U.S. Cl.
CPC .. *G06F 17/30053* (2013.01); *G06F 17/30766* (2013.01)

(58) Field of Classification Search
CPC ......... G06F 17/30053; G06F 17/30766; G06F 2216/01; H04N 21/4788; H06N 21/4788
USPC ............................ 715/745, 202, 751; 702/189
See application file for complete search history.

(56) References Cited

U.S. PATENT DOCUMENTS

| | | | | |
|---|---|---|---|---|
| 7,752,270 B2 * | 7/2010 | Durand et al. | ................. | 709/206 |
| 7,797,446 B2 * | 9/2010 | Heller et al. | ................... | 709/242 |
| 7,805,129 B1 * | 9/2010 | Issa et al. | ................... | 455/412.1 |
| 7,835,689 B2 * | 11/2010 | Goldberg | ............. | G10H 1/0025 |
| | | | | 455/3.06 |
| 7,917,148 B2 * | 3/2011 | Rosenberg | ............. | G06Q 10/10 |
| | | | | 455/414.1 |
| 8,175,989 B1 * | 5/2012 | Gopinath | ............... | G06N 7/005 |
| | | | | 706/45 |
| 8,321,518 B2 * | 11/2012 | Durand | ................ | G06Q 10/107 |
| | | | | 709/203 |
| 8,620,699 B2 * | 12/2013 | Svendsen | .......... | G06F 17/30 |
| | | | | 705/14.4 |
| 2003/0216183 A1* | 11/2003 | Danieli | ................... | A63F 13/12 |
| | | | | 463/42 |
| 2008/0091717 A1* | 4/2008 | Garbow | ............ | G06F 17/30749 |
| 2008/0098305 A1* | 4/2008 | Beland | .......................... | 715/719 |
| 2009/0049045 A1* | 2/2009 | Askey et al. | ..................... | 707/7 |
| 2009/0164514 A1* | 6/2009 | Svendsen et al. | ......... | 707/104.1 |

* cited by examiner

*Primary Examiner* — Manglesh M Patel
*Assistant Examiner* — Nicholas Hasty
(74) *Attorney, Agent, or Firm* — Thomas Horstemeyer, LLP

(57) ABSTRACT

Disclosed are various systems, methods, and other embodiments for group control of networked media play. In various embodiments, an application is executed in a server that maintains a play list of media content items in association with a group of individuals. The media content items listed in the play list are transmitted from the server to a plurality of clients, each of the clients being associated with a corresponding one of the individuals in the group. The play list is modified as a function of client interaction with the application.

20 Claims, 6 Drawing Sheets

| Song | Artist | Cheers | Boos | Approvals | Disapprovals | ○ ○ ○ |
|---|---|---|---|---|---|---|
| Carry On Wayward Son | Kansas | 6 | 4 | 9 | 1 | |
| Another One Bites the Dust | Queen | 5 | 3 | 8 | 2 | |
| (Don't Fear) The Reaper | Blue Oyster Cult | 6 | 2 | 7 | 4 | |
| Eye of the Tiger | Survivor | 5 | 1 | 8 | 3 | |
| Gimme Shelter | Rolling Stones | 6 | 0 | 9 | 4 | |
| Born to Run | Bruce Springsteen | 5 | 1 | 9 | 5 | |
| Jump | Van Halen | 6 | 2 | 8 | 4 | |

| Individual | Cheers | Boos | Approvals | Disapprovals | Participation | ○ ○ ○ |
|---|---|---|---|---|---|---|
| LarryHarris | 6 | 4 | 75 | 10 | 56/100 | |
| CScofield | 7 | 3 | 76 | 9 | 55/100 | |
| LNguyen | 8 | 2 | 77 | 8 | 57/100 | |

GROUP CONTROL OF NETWORKED MEDIA PLAY

BACKGROUND

Individuals are able to create play lists that can be placed on music players such as MP3 players and the like. However, a group of individuals are not able to collaborate to generate a play list in an interactive manner.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 depicts an example of records associated with media content items stored in a data store accessed by a server in the media transmission network of FIG. 1 according to an embodiment of the present disclosure.

FIG. 4 depicts an example of records associated with individuals associated with respective clients in the media transmission network of FIG. 1 according to an embodiment of the present disclosure.

DETAILED DESCRIPTION

Figure 1:
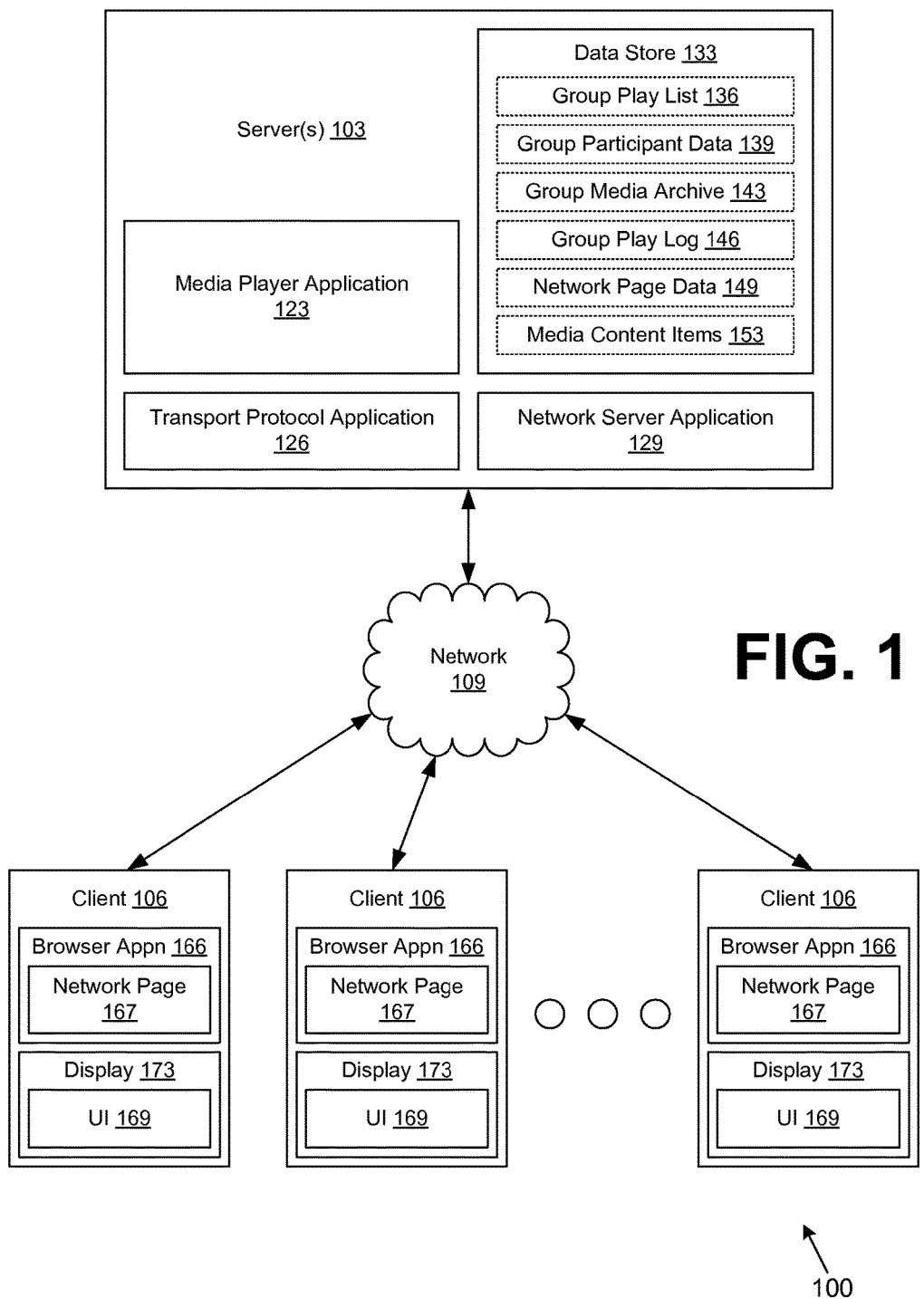
FIG. 1 is a drawing of a media transmission network according to an embodiment of the present disclosure.

With reference to FIG. 1, shown is a media transmission network 100 according to various embodiments of the present disclosure. The media transmission network 100 includes one or more servers 103 that are in data communication with clients 106 by way of a network 109. The network 109 includes, for example, the Internet, intranets, wide area networks (WANs), local area networks, wireless networks, or other suitable networks, etc., or any combination of two or more such networks. Various applications on the server 103 facilitate a transmission of media content items to a group of individuals. Each individual in the group may provide feedback that ultimately may result in the modification of a play list of media content items transmitted to the members of the group as will be described.

The server 103 may comprise one or more server computers arranged in a server bank or other arrangement. The server 103 may be localized in a single location, or may comprise one or more servers distributed across diverse geographical areas.

The server 103 includes a media player application 123, a transport protocol application 126, and a network server application 129. Also, associated with the one or more servers 103 is a data store 133. Stored within the data store 133 are various data or files that are accessed by the media player application 123 and/or by other applications to perform the various functions as will be described. Among the data stored in the data store 133 are a group play list 136, group participant data 139, a group media archive 143, a group play log 146, network page data 149, and various media content items 153.

The media player application 123 is employed to maintain a play list of media content items 153 and perform other functions as will be described. The transport protocol application 126 facilitates transmission of media content items 153 to various clients 106 associated with individuals of a group as will be described. The network server application 129 facilitates communication with various applications on the clients 106 such as browser applications as will be described. To this end, the network server application 129 may comprise a web server or other server application with like capability as can be appreciated. The network server application 129 facilitates interaction with the media player application 123 on the part of the clients 106 as will be described.

The transport protocol application 126 may implement any one of a plurality of transmission formats to transmit media content items 153 to the clients 106. For example, the media content items 153 may be streamed to one or more clients 106 by way of unicast or multicast streaming. Alternatively, the media content items 153 may be transmitted in some other manner such as, for example, by a bulk transfer of media content items 153 that are made accessible by the receipt of a password or via some other approach, etc.

The group play list 136 comprises a play list of media content items 153 that is served up to the clients 106 by the media player application 123 through the transport protocol application 126. Such media content items 153 are transmitted to the client 106 through the transport protocol application 126. The group play list 136 can be modified based upon feedback from the clients 106 manipulated by individuals of a group as will be described. The group participant data 139 comprises data about the individual members of the group that are authorized to receive the transmitted media content items 153 from the group play list 136.

The group participant data 139 is employed to determine the impact of feedback from respective members of a group based upon various factors such as their participation, and approval from other members of the group for the various media content items 153 they wish to consume as will be described. The group media archive 143 comprises media content items 153 that had previously existed in the group play list 136 and were transmitted to the clients 106. In this respect, the group media archive 143 provides a history of the media content items 153 transmitted to the clients 106.

The group play log 146 provides a record of what media content items 153 were transmitted at what time to the clients 106. The network page data 149 includes graphical information that is employed, for example, to dynamically generate one or more user interfaces that are transmitted to the clients 106 in order to enable individuals of the group that manipulate such clients 106 to interact with the media player application 123 as will be described. The media content items 153 comprise the actual media content that is transmitted to the clients 106 through the transport protocol application 126. The media content items 153 may comprise, for example, audio tracks such as songs or other audio content, video content, audio/video content, or other content as can be appreciated.

It is also understood that the one or more servers 103 may be employed to execute other applications and access other data beyond those described above as can be appreciated.

Each of the clients 106 may comprise, for example, a computer system such as a desktop, laptop, or other computer system. The clients 106 may also comprise personal digital assistants, cellular telephones, set top boxes, or other systems with like capability. Further, the clients 106 may also comprise any device that is network capable that can communicate with the server 103 over the network 109 to perform various functions as can be appreciated. Such clients 106 may comprise, for example, processor based devices having processor circuits comprising a processor and a memory.

The clients 106 may be configured to execute various applications such as a browser application 166 or other applications as can be appreciated. The browser application 166 may be executed in a client 106 to access and render network pages 167 such as web pages or other network content served up by the one or more servers 103. The network pages 167 may be generated dynamically, for example, based upon the network page data 149 and other data stored in the data store 133. In one embodiment, the browser application 166 interfaces with the network server application 129 and the media player application 123 in order to obtain a network page 167 that facilitates interaction with the media player application 123. The network page 167 includes, for example, various executable components to facilitate the interaction with the media player application 123 and the network server application 129. The network page 167 is implemented by the browser application 166 and generates a user interface 169 on a display device 173 associated with the client 106.

Next, a general description of the operation of the various components of the media transmission network 100 is provided. The media player application 123 is executed in the one or more servers 103 to maintain the group play list 136 of media content items 153 in association with a predefined group of individuals. The group of individuals may be specified by a founding one of the individuals or in some other manner. The media player application 123 interacts with the transport protocol application 126 in order to transmit media content items 153 from the play list 136 to each of the clients 106 associated with one of the individuals in the group. Over time, media content items 153 are added or deleted from the play list 136, or the priority of media content items 153 in the play list 136 is modified as a function of client interaction with the media player application 123.

It is possible that a given individual may control two or more clients 106, where the media content items 153 are transmitted to a first one of the clients 106, and the user manipulates a second one of the clients 106 to interface with the media player application 123 as will be described below. To this end, the transport protocol application 126 transmits the media content items 153 to an appropriate address of the client 106 that is to render the media content item 153 as specified by a user.

The network page 167 that is executed by the browser application 166 and the clients 106 facilitates the selection of media content items 153 by individuals within the group to be included in the group play list 136. For example, the network page 167 may facilitate the creation of an individual play list (not shown) for an individual member of the group that is stored in the server 103 from which media content items 153 may be selected for inclusion in the group play list 136.

Each of the media content items 153 included in the group play list 136 includes a media rating value. The media rating value for each media content item 153 is generated based on a number of factors such as feedback about the media content item 153 from other individuals in the group, the frequency at which the media content item 153 has been transmitted to the clients 106, and a rating of an individual that nominates a given media content item 153 for inclusion in the group play list 136. Also, other factors may be weighed in determining the media rating value associated with a given media content item 153 in the group play list 136. Such media rating values may be stored in association with the media content items 153 in the group media archive 143 for future reference. Such media rating values may be updated over time from time to time based on the various factors. The priority of media content items 153 in the group play list 136 may depend upon the media rating values associated with each of the respective media content items 153.

The feedback provided by given ones of the clients 106 for a given media content item 153 may be in the form of a positive or negative feedback message that causes a score to be incremented for a respective media content item 153 based on a positive or negative feedback. In addition, the message may cause the media player application 123 to add audio content over one of the media content items 153 currently being transmitted to the clients 106. In this respect, for example, the feedback may be in the form of a "cheer" or a "boo" that indicates the approval or disapproval of a given individual.

Alternatively, the user may be able to record audio feedback in real time at the client 106 that is then transmitted to the media player application 123 and superimposed or added over the media content item 153 currently transmitted to each one of the clients 106. In this manner, individuals of a group can express their audio approval and disapproval of a currently transmitted media content item 153 in much the same way as they may be able to provide audio feedback about a media content item 153 if they were all sitting in the same room listening together.

The audio feedback applied to a given media content item 153 may be tracked by a media player application 123 with respect to the media content item 153 in order to determine the media rating value as described above for the media content item 153. For example, every time a "boo" or "cheer" is generated with respect to a given media content item 153, a corresponding score may be incremented, etc. Any feedback that indicates approval or disapproval of a given media content item 153 is stored in association with the media content item 153 in the group media archive 143 so that such data may be employed in calculating the media rating value of the media content item 153 should it be added to the group play list 136 at a future time.

In addition, the network page 167 facilitates sending feedback that simply indicates approval or disapproval for a given media content item 153 based upon manipulation of components of the network page 167 on the client 106. Such feedback may or may not involve audio/video feedback that is transmitted along with the media content item 153 to the clients 106.

Such feedback may be applied to media content items 153 included in the group play list 156 that have yet to be transmitted to the clients 106 by the media player application 123 through the transport protocol application 126. As such, the media rating value for such a media content item 153 may be recalculated based upon the feedback received before it is transmitted to the clients 106. As such, the ultimate priority of the media content items 153 in the group play lists 136 may be shifted or changed due to the changing media rating values for respective media content items 153 in the group play list 136 at any given time based upon feedback received with respect to such items. This is the case where the priority of the media content items 153 in the play list 136 depend upon the media rating values.

When a new media content item 153 is added to the group play list 136 by an individual in a group, a media rating value is calculated for the media content item 153 based on various factors. Such factors may comprise, for example, the prior feedback information associated with the media content item 153 stored in the group media archive 143, although this feedback information may also be ignored. The factors may also include a rating associated with one of the individuals that nominated the media content item 153 to be included in the group play list 136. To this end, the rating associated with an individual may be a rating developed based upon their participation in a social networking site or based upon some other concepts. The rating may also depend upon a frequency at which the media content item 153 has been transmitted to the clients 106, or other factors. Based on the input from a given individual, the media player application 123 places the media content item 153 in the group play list 136. The priority of the media content item 153 added to the group play list 136 depends upon the media rating value for such media content item 153. Thus, it is possible for a given media content item 153 to be placed into the group play list 136 at a higher priority then media content items 153 already existing in such play lists 136 due to a higher media rating value for such media content item 153.

In this sense, the individuals within the group control which media content items 153 are transmitted to the clients 106 over time by virtue of their feedback. For example, significant positive feedback received for a given media content item 153 will give it a higher priority for transmitting to the clients 106. Significant negative feedback will provide for a lower priority for transmitting of a given media content item 153. It is possible that over time, based upon feedback received from the clients 106, that a given media content item 153 may receive favorable treatment initially, and then negative treatment over time as the tastes of the individuals in the group change or as they become tired of consuming a given media content item 153.

In order to calculate the media rating value at a given time, various functions may be employed such as a cost function as follows:

$$V = C_1 f_1 + C_2 f_2 + C_3 f_3 + \ldots + C_N f_N,$$

where V is the media rating value, $C_N$ are weighting constants, and $f_N$ comprises values representing the various factors as described above.

Figure 2:
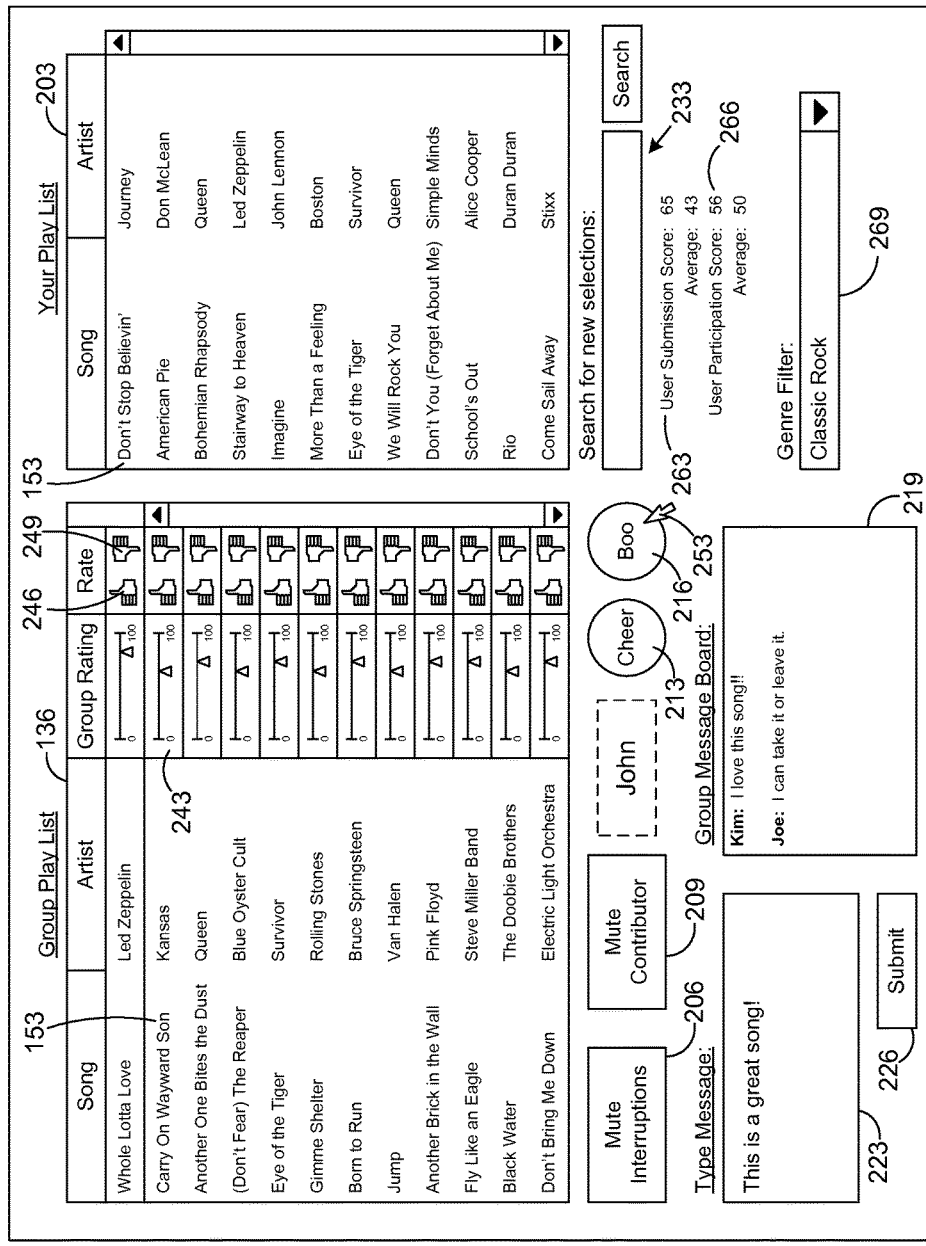
FIG. 2 is a drawing of one example of a user interface rendered in a client in the media transmission network of FIG. 1 according to an embodiment of the present disclosure.

With reference to FIG. 2, shown is one example of a user interface 169 (FIG. 1) according to various embodiments. The user interface 169 is rendered, for example, on a display device 173 (FIG. 1) associated with a respective client 106 (FIG. 1) based upon the network page 167 (FIG. 1) as implemented by a browser application 166 (FIG. 1). The user interface 169 includes a group play list 136 (FIG. 1) and an individual play list 203. Also, the user interface 169 also includes a "mute audio interruptions" button 206, a "mute audio contributor" button 209, a "cheer" button 213, and a "boo" button 216. The user interface 169 further includes a group message board 219 to display messages from various individuals in a given group.

A message entry box 223 is provided so that an individual may enter a message to be included on the group message board 219. A submit button 226 accompanies the message entry box 223 so that a user may indicate that a given message typed in the message entry box 223 be submitted for inclusion on the group message board 219. To this end, the one or more servers 103 may maintain the group message board 219 as can be appreciated. Also, the user interface 169 includes a search mechanism 233 that may be manipulated in order to search for a new media content item 153 to be included in the individual play list 203 or the group play list 136. The search mechanism 233 may facilitate the generation of subsequent user interfaces 169 in order to provide for a search for and selection of various media content items 153 for inclusion in the respective play lists 136, 203 as described above.

The group play list 136 depicts each of the media content items 153 that are slated to be transmitted to the respective clients 106 as described above. The media content items 153 in the group play list 136 are arranged according to a priority based upon a media rating value calculated for each media content item 153 when it is included in the group play list 136. Alternatively, the priority of the media content items 153 in the group play list 136 may depend upon other factors. The media rating value may be calculated as described above or in some other manner as can be appreciated. Associated with each of the media content items 153 in the group play list 136 is a group rating 243 that is calculated based upon various factors associated with the media content item 153 in the group media archive 143 as will be described. Also, associated with each of the media content items 153 are an approval icon 246 and a disapproval icon 249.

The approval and disapproval icons 246 and 249 may be manipulated by a user to indicate approval or disapproval of a given media content item 153 listed in the group play list 136. In order to manipulate the approval or disapproval icons 246 or 249, or any other component in the user interface 169, the user may "click" on an icon by positioning a cursor 253 over a given component and manipulating a button on a mouse associated with the client 106. Alternatively, other approaches may be used to manipulate the various buttons, icons, or other components of the user interface 169 as can be appreciated.

A user may click on the approval or disapproval icons 246 or 249 to express their approval or disapproval of a given media content item 153 in the group play list 136. When the approval or disapproval icons 246 or 249 are manipulated, an executable portion of the network page 167 sends a message to the media player application 123 in the server 103 through the network server application 129 that informs the media player application 123 of the approval or disapproval of the respective media content item 153. Such approval or disapproval is recorded in association with the content item 153 in the group media archive 143. Also, such approval or disapproval is associated with the media content item 153 in the group play list 136. Based upon the change in approval or disapproval of a given media content item 153, the media player application 123 may recalculate a media rating value for the media content item 153 which may result in a shuffling or reordering of the priority of the media content items 153 in the group play list 136.

At the top of the group play list 136 is a currently transmitted one of the media content items 153 that may be highlighted or differentiated from the remaining media content items 153 in the group play list 136 in some other manner. Alternatively, the only media content item 153 viewed in the group play list 136 may be the currently transmitted one of the media content items 153, where the remaining media content items 153 are not displayed in the group play list 136 in the user interface 169.

An individual may relay approval or disapproval associated with the currently transmitted one of the media content items 153 by clicking on the appropriate approval or disapproval icons 246 or 249. Alternatively, a user may click on the cheer button 213 or the boo button 216. If the user clicks on the cheer button 213, then the network page 167 sends a message to the media player application 123 indicating the approval of the currently playing one of the media content items 153. In response, the media player application 123 injects an audible "cheer" sound or something similar to such a sound that indicates an audible approval of the currently transmitted media content item 153. Such an audible approval will be included or superimposed on top of the media content item 153 transmitted to the various clients 106 so that other individuals in the group can hear the approval. Alternatively, the cheer button 213 or the boo button 216 may be manipulated in order to initiate the recording of audio feedback to be superimposed onto a currently transmitted one of the media content items 153. The determination as to whether such feedback is positive or negative depends upon which of the cheer button 213 or boo button 216 were manipulated to start the recording.

Similarly, if the individual clicks on the boo button 216, then a message is transmitted to the media player application 123 indicating the disapproval of the currently transmitted media content item 153. Also, the media player application 123 will cause an audible "boo" or equivalent audio sound to be included or superimposed on top of the current media content item 153 transmitted to the clients 106 so that other individuals can hear the disapproval. Note that while an audible boo or cheer is described herein, it is understood that a video boo or cheer may be generated and transmitted on top of a video signal sent to the various clients 106. Further, boos or cheers or other feedback may take any form appropriate for a respective media content item 153. For example, an audio boo or cheer may be added to the audio that accompanies video as can be appreciated.

Thus, the feedback provided by the cheer and boo buttons 213 and 216 can match the nature of the media content item 153 transmitted or transmitted to the clients 106. Such feedback may take the shape of audio, video, audio/video, or other form as can be appreciated. In this manner, the media player application 123 allows users within a group to express their approval or disapproval of a currently transmitted media content item 153 in much the same way they might do were they all within the same room listening or otherwise consuming the media content item 153 together.

In addition, it may be the case that members of the group wish for a given individual to stop relaying audio or visual feedback by pressing cheer or boo buttons 213 and 216 repeatedly. In the context of a group experience within a single room, this would be the equivalent of hushing a person who is behaving unacceptably and interrupting the listening or viewing experience. The "mute contributor" button 209 may be clicked upon by a user to send a message to the server 103 informing the media player application 123 that they wish for the current contributor of the feedback to be silenced.

The media player application 123 may include a benchmark percentage of individuals in the group. Once this threshold percentage of individuals has indicated that they wish for the current audio feedback contributor to be silenced, then the media player application 123 is configured to cease including such audio feedback into the media content item 153 currently transmitted to the clients 106. In such case, the contributor of the offending feedback may be silenced for a period of time which may comprise, for example, the duration of the transmitting of the current media content item 153, or for some other time period as punishment for excessive feedback that is disruptive. This provides a mechanism for enforcing acceptable social behavior within the group.

In addition, various individuals may wish to listen to or view the media content items 153 transmitted from the servers 103 without audio feedback interruptions. In order to accomplish this, a user may click on the "mute interruptions" button 206 that causes the media player application 123 to omit the inclusion of feedback into the transmitted media content item 153 transmitted to a respective client 106 that has clicked on the mute interruptions button 206. The mute interruptions button 206 may stay active until the user clicks on it a second time, or it may only stay active for the currently transmitted media content item 153. Alternatively, the mute interruptions button 206 may be active only for a predefined period of time as can be appreciated.

A user of a given client 106 may select a media content item 153 depicted in the individual play list 203 to be included in the group play list 136 by dragging and dropping such media content item 153 from the individual play list 203 to the group play list 136. Alternatively, other approaches may be employed to transfer media content items 153 from the individual play list 203 to the group play list 136. Such approaches may involve the use of selection boxes and buttons to cause media content items 153 to be transferred from the individual play list 203 to the group play list 136. Further, it may be possible to present further user interfaces 169 that list potential media content items 153 in a manner that they may be selected for inclusion in a group play list 136 as can be appreciated.

The message board 219 may be employed for individuals within a group to communicate to each other relative to the current media content item 153 transmitted to the clients 106 or for other purposes. For example, if the group of individuals comprises a group of friends, they may communicate with each other about other topics beyond the media content items 153. In order for an individual to submit a message to be displayed on the group message board 219, the user may type in a message in the message input box 223 and click on the submit button 226 to cause the message to be displayed in the group message board 219. When a message is submitted, the network page 167 transmits a message to the media player application 123 that includes the typed message as well as the name of the user that submitted the message for inclusion on the group message board 219 as shown. In addition, other formats for the display of messages may be selected.

In addition, the user interface 169 may also show a user submission score 263 and a user participation score 266. The user submission score 263 indicates a score associated with the feedback that the user has received for media content items 153 that they added to the group play list 136. Specifically, if a user adds a particular media content item 153 to the group play list 136, then any feedback whether relayed by manipulation of approval or disapproval icons 246, 249 or the cheer or boo buttons 213, 216, may be recorded with respect to the media content item 153 itself and in association with the individual who nominated the media content item 153 to be included in the group play list 136.

Thus, a user that submits media content items 153 that are favored by the members of the group will have a higher user submission score 263 whereas a user who submits media content items 153 that are generally disfavored by the members of a group will have a lesser user submission score 263. The user participation score 266 indicates a degree to which a given individual participates in the function of the media player application 123 or other application such as a social networking site, etc. Such participation may involve sending feedback regarding the media content items 153 or adding media content items 153 to the group play list 136. In addition to the user submission score 263 and the user participation score 266, average scores may also be depicted so that a user can weigh their score against the group averages.

The user interface 169 further includes a filter selector 269 that may be manipulated by a user to indicate that they wish to hear media content items 153 of a specific category. A category of media content items 153 may comprise a genre, classification, or other grouping or division of media content items 153. For example, where the media content items 153 comprise songs, various categories may comprise rock, classical, pop, and/or other categories or genres. Assuming that a threshold number or percentage of the individuals in the group have indicated that they wish to filter the media content items 153 according to the same category based on the state of their respective filter selectors 269, then the media player application 123 proceeds to implemented a filter of the media content items 153 in the play list 136 that are transmitted to the clients 106 to include only media content items 153 that belong to the category. In this manner, individuals in the group may "vote" to determine what type of category of media content items 153 they wish to consume.

Referring next to FIG. 3, shown is one example of the group media archive 143 according to an embodiment of the present disclosure. The group media archive 143 lists the media content items 153 and the feedback received, whether such feedback was perceivable feedback generated by manipulation of the cheer or boo buttons 213 or 216, or approval or disapproval voiced by manipulating the approval or disapproval icons 246 or 249. In addition, other information about each of the media content items 153 may be maintained in the group media archive 143. Generally, the group media archive 143 lists any media content item 153 that was included in the group play list 136 at a given time.

The group media archive 143 thus provides a location for the storage of the feedback associated with the media content items 153 for use in calculating media rating values, assuming that such media content items 153 are added to the group play list 136 in the future. When a media content item 153 is first added to the group play list 136, the media player application 123 is configured to generate a new entry in the group media archive 143 so that the feedback associated with such media content item 153 can be stored for future reference.

In addition, it is understood that other information may be stored relative to the media content items 153 in the group media archive 143. To this end, each time a feedback is expressed for a given media content item 153, an appropriate value associated with such type of feedback is incremented. Alternatively, the individual that generated the feedback may also be recorded with respect to each instance of feedback in the group media archive 143. This is done so that a track record may be kept of those individuals that provided the feedback associated with the given media content item 153.

Referring next to FIG. 4, shown is one example of the group participant data 139 stored in the data store 133 (FIG. 1) according to various embodiments. The group participant data 139 indicates the respective individuals in a given group associated with a given play list 136. Each time feedback is voiced for a given media content item 153 that was added to the play list 136 by a given individual, then a respective feedback field is incremented relative to the individual 273 in the group participant data 139. In this manner, all of the cheers and boos generated by manipulation of cheer and boo buttons 213 and 216, or approvals and disapprovals are generated by manipulation of approval and disapproval icons 246 and 249 with respect to a given individual 273 are tracked in the group participant data 139.

In addition, the group participant data 139 includes participation data 276 that indicates how fully a given individual 273 participates in the functionality of the media player application 123 or other application associated with the media player application 123. For example, the media player application 123 may be implemented as part of a social networking site requiring participation including the entry of personal data and other information, and/or participation in various activities. The degree to which a person participates in such other applications or with the various functionality of the media player application 123 may be quantified and included in the group participant data 139 as a participation score 276. The feedback values and participation scores 276 contained within the group participant data 139 may be employed in generating a media rating value for a media content item 153 added to the group play list 136 by a respective user 273.

Figure 5:
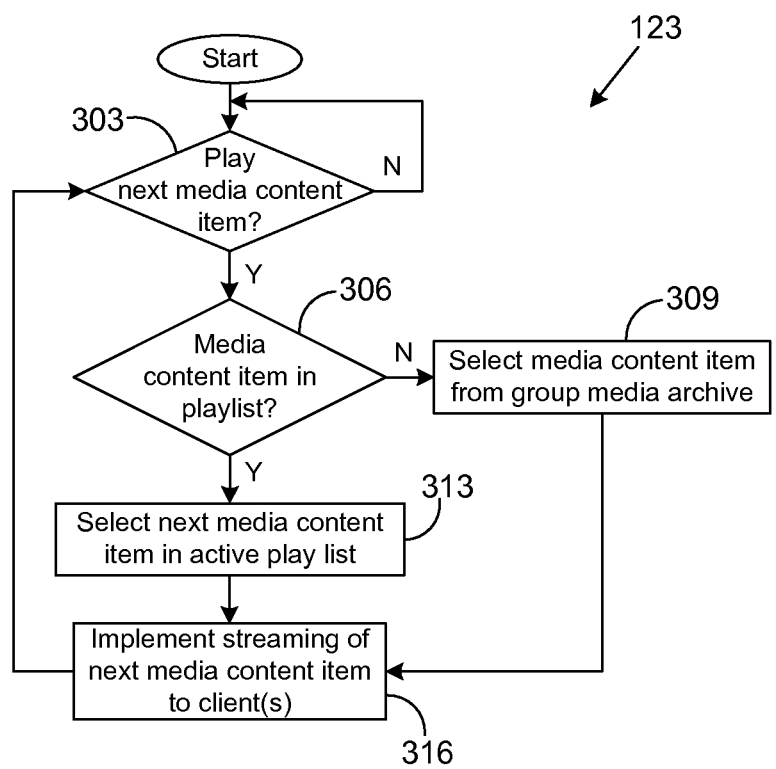
FIG. 5 depicts a flowchart that illustrates one example of functionality associated with a media player application executed in a server in the media transmission network of FIG. 1 according to an embodiment of the present disclosure.

Referring next to FIG. 5, shown is one flowchart that shows one example of functionality of the media player application 123 in selecting media content items 153 to be transmitted to the client 106 according to various embodiments. Alternatively, the flowchart of FIG. 5 may be viewed as depicting example steps of the method implemented in the one or more servers 103 in order to select a media content item 153 to be transmitted to the clients 106.

Beginning with box 303, the media player application 123 waits until it is time to transmit the next media content item 153 to the clients 106 (FIG. 1). Assuming that the transmitting of the current media content item 153 (FIG. 2) has ended, then in box 306, the media player application 123 determines whether any media content items 153 are currently listed in the group play list 136. If not, then in box 309, the media player application 123 selects a media content item 153 from the group media archive 143 to be transmitted to the clients 106. Alternatively, the media player application 123 may simply wait until one of the clients 106 indicates that a new media content item 153 is to be added to the group play list 136.

However, if media content items 153 exist in the group play list 136 as determined in box 306, then the media player application 123 proceeds to box 313 in which the next media content item 153 with the highest priority is selected from the group play list 136 to be transmitted to the clients 106. In box 316, the media player application 123 interacts with the transport protocol application 126 (FIG. 1) to implement the transmitting of the next media content item 153 to the clients 106. In doing so, a pause or period of silence may be injected between the respective media content items 153 as can be appreciated. Also, where appropriate, fading and expanding techniques may be employed to change the volume as such items are ended or begun as can be appreciated. Note that in selecting a media content item 153 from the group play list 136, the highest priority media content item 153 is always selected which is the media content item 153 with the highest calculated media rating value as described above.

Figure 6:
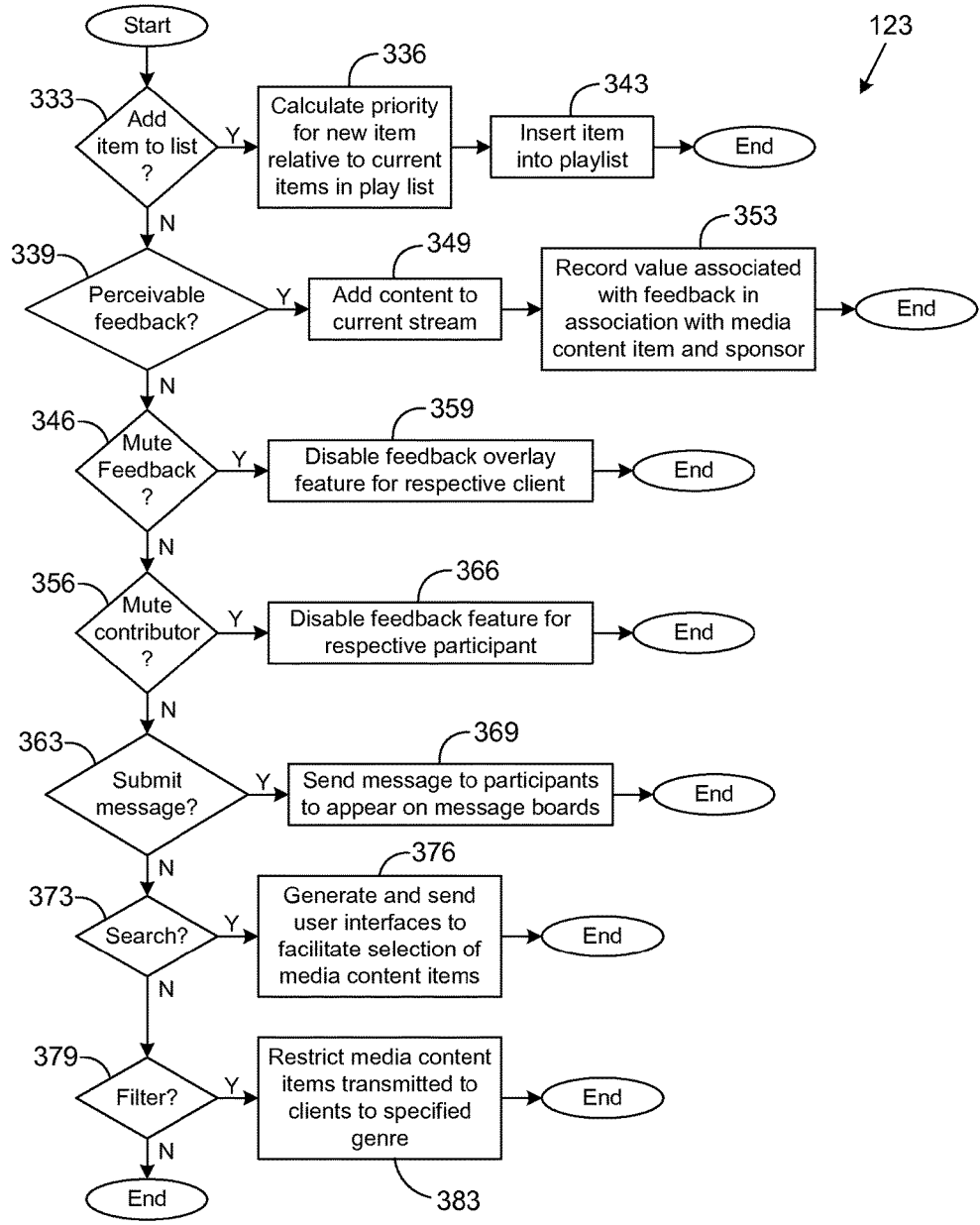
FIG. 6 depicts a flowchart that illustrates another example of functionality associated with a media player application executed in a server in the media transmission network of FIG. 1 according to an embodiment of the present disclosure.

With reference to FIG. 6, shown is a flowchart that provides one example of various functions of the media player application 123 in interacting with clients 106 (FIG. 1) to perform various functions such as modifying the group play list 136 (FIG. 2) and recording feedback as described above. Alternatively, the flowchart of FIG. 6 may be viewed as depicting steps of methods implemented in the one or more servers 103 (FIG. 1) in order to facilitate the interaction of clients 106 with the media player application 123 as mentioned above.

The flowchart of FIG. 6 particularly depicts the reaction of the media player application 123 to process messages received from clients 106. In this respect, the functionality of FIG. 6 is implemented each time a message is received from a respective one of the clients 106 in order to process the message accordingly.

Beginning in box 333, the media player application 123 first determines whether a message indicates that it is to add a media content item 153 to the group play list 136. This message is generated by an action of an individual 273 (FIG. 4) dragging and dropping a media content item 153 from the individual play list 203 (FIG. 2) to the group play list 136 or including a media content item 153 in the play list 136 by some other approach as described above. Assuming that a media content item 153 is to be added to the group play list 136, then the media player application 123 proceeds to box 336. Otherwise, the media player application 123 proceeds to box 339. In box 336, the media rating value is calculated for the new media content item 153 so as to determine the priority of the new media content item 153 relative to the current media content items 153 in the play list 136.

This may be done, for example, by employing a cost function as describe above or in some other manner as can be appreciated. Then, in box 343, the media content item 153 is inserted into the group play list 136 at the respective priority position as would be indicated by the media rating value calculated in box 336. Thereafter, the media player application 123 ends as shown.

Assuming in box 333 that there is no media content item 153 to add to the group play list 136, then the media player application 123 proceeds to box 339. In box 339, the media player application 123 determines whether a message has been received indicating that a perceivable feedback is to be created for the current media content item 153. Such perceivable feedback may be an audio feedback, video feedback, or other feedback as is appropriate for the type of media content item 153 transmitted to the clients 106. If no perceivable feedback is to be created, then the media player application 123 proceeds to box 346. Otherwise, the media player application 123 moves to box 349.

In box 349, the content associated with the feedback such as a "cheer" or "boo" is added to or superimposed upon the current transmitted media content item 153 transmitted to the clients 106. Thereafter, in box 353, a value is recorded associated with the feedback in association with the media content item 153 in the group media archive 143 and in association with the individual that added the media content item 153 in the group participant data 139. Thereafter, the media player application 123 ends as shown.

In box 346, the media player application 123 determines whether the message received from a client 106 requires it to mute any feedback content that normally would be added to the transmitted media content item 153 sent to the respective client 106. Such a message would be generated due to a manipulation of the mute interruptions button 206 (FIG. 2). If not, then the media player application 123 proceeds to box 356. Otherwise, the media player application 123 progresses to box 359.

In box 359, the media player application 123 disables the feedback that is added to or superimposed onto the media content item 153 currently transmitted to the clients 106 for a respective one of the clients 106. In this respect, the media player application 123 tracks whether each respective client 106 associated with the group of individuals is to receive media content items 153 with or without added or superimposed media feedback as described above. Thereafter, the media player application 123 ends as shown.

In box 356, the media player application 123 determines whether to mute the feedback contributions by a given one of the individuals of a group. In this respect, a number of individuals in the group will have manipulated the "mute contributor" button 209 (FIG. 2) to express their displeasure at the feedback by a given one individual in the group. The media player application 123 may determine whether to mute the feedback from such individual depending on the percentage of those individuals in the group that have clicked on the mute contributor button 209 on their respective client 106.

Assuming that a threshold percentage or threshold number of the individuals in the group have not clicked on the mute contributor button 209, then the media player application 123 proceeds to box 363. Otherwise, the media player application 123 progresses to box 366. In box 366, the media player application 123 disables the ability for an individual to leave perceivable feedback with respect to the media content item 153 currently transmitted to the client 106. This encourages proper social behavior or etiquette in the group. Thereafter, the media player application 123 ends.

Next, in box 363, the media player application 123 determines whether a message has been received from a individual 273 to be placed on the group message board 219. If so, then the media player application 123 progresses to box 369. Otherwise, the media player application 123 moves to box 373. In box 369, the message received from a given one of the clients 106 is sent to each of the other clients 106 to appear on the respective message boards 219 of the respective clients 106. Thereafter, the media player application 123 ends as shown.

In box 373, the media player application 123 determines whether a search is to be performed for additional media content items 153 to be included in the individual play list 203 or the group play list 136. If such a search is to be performed, then in box 376 the media player application 123 generates one or more network pages 167 with user interfaces 169 to facilitate searching for and selection of additional media content items 153 as can be appreciated. Thereafter, the media player application 123 ends as shown. Assuming that no search is to be performed in box 373, then the media player application 123 proceeds to box 379.

In box 379, the media player application 123 determines whether an individual has changed the state of their filter selector 269 (FIG. 2) such that a threshold number or percentage of the individuals in the group indicate that they wish for the media content items 153 to be filtered according to a specific category. If so, then the media player application 123 proceeds to box 383. Otherwise, the media player application 123 ends as shown.

In box 383 the media player application 123 applies a filter to the media content items 123 in the group play list 136 that are transmitted to the clients 106. In one embodiment, this may entail removal of all media content items 153 from the group play list 136 that do not belong to the category for which filtering is implemented. Alternatively, the media player application 123 may implement or execute a function that is configured to filter the media content items 153 by marking all media content items 153 that are not of the category for which filtering has been implemented. Such marked media content items 153 are ignored until the filter is removed and the marks are eliminated. In addition, users may be prevented from adding media content items 153 to the group play list 136 that are not of the specified category. Once the media content items 383 are filtered according to the selected category, the media player application 123 ends as shown.

It is understood that there may be other functions associated with the media player application 123 that are not described herein in detail, where the above discussion provides examples of some of the functionality of the media player application 123.

Figure 7:
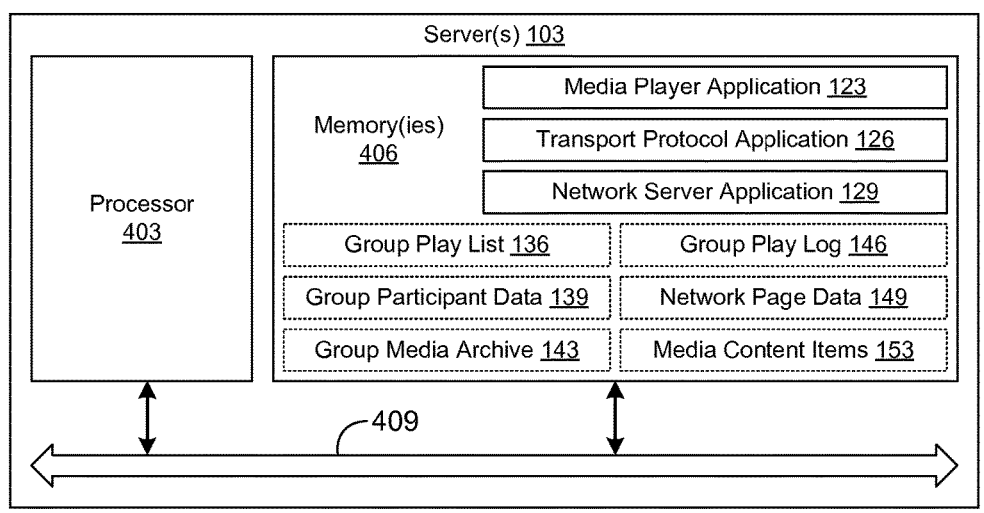
FIG. 7 is a schematic block diagram that provides one example illustration of a server employed in the media transmission network of FIG. 1 according to an embodiment of the present disclosure.

Referring next to FIG. 7, shown is a schematic block diagram of one example of a server 103 according to an embodiment of the present disclosure. The server 103 includes a processor circuit, for example, having a processor 403 and a memory 406, both of which are coupled to a local interface 409. To this end, the server 103 may comprise, for example, a server computer with such structure. The local interface 409 may comprise, for example, a data bus with an accompanying address/control bus or other bus structure as can be appreciated.

Stored in the memory 406 are both data and several components that are executable by the processor 403. In particular, stored in the memory 406 are the media player application 123, the transport protocol application 126, and the network server application 129. In addition, a server operating system may be stored in the memory 406 and executed by the processor 403 as can be appreciated.

Also, the group play list 136, group participant data 139, group media archive 143, group play log 146, network page data 149, and media content items 153 may be stored in the data store 133, for example, in the memory 406, or they may be stored in some other memory accessible to the server 103. It is understood that there may be other applications that are stored in the memory 406 and are executable by the processor 403 as can be appreciated. Also, other data may be stored in the memory 406 and accessed by the processor 403. Where any component discussed herein is implemented in the form of software, any one of a number of programming languages such as, for example, C, C++, Java, Java Script, Perl, Python, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, or source code that may be expressed in proper format such as object code that is capable of being loaded into a random access portion of the memory 406 and executed by the processor 403, etc. An executable program may be stored in any portion or component of the memory 406 including, for example, random access memory, read-only memory, a hard drive, compact disk (CD), floppy disk, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components executed on the server 103 as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowcharts of FIGS. 5 and 6 show the functionality and operation of portions of the media player application 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the media player application 123 and/or any other component implemented in the server 103 as described above comprises software or code, the same can be embodied in any computer-readable medium for use by or in connection with an instruction execution system such as, for example, a processor in a computer system or other system. In this sense, the media player application 123 and/or other component may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program, when executed, causes the at least one computing device to at least:
   execute an application in a server that maintains a play list of media content items in association with a group of individuals;
   serve a user interface associated with the play list to a plurality of clients, the user interface facilitating a client interaction with the application via a network, individual ones of the plurality of clients being associated with a corresponding one of the individuals in the group;
   transmit a current media content item of the media content items in the play list from the server to the individual ones of the plurality of clients, the current media content item being transmitted for playback;
   receive feedback from at least one of the plurality of clients in response to the playback of the current media content item in the individual ones of the plurality of clients, the feedback comprising a text message on a group message board rendered on the user interface, the group message board displaying a plurality of messages transmitted from the individual ones of the plurality of clients, wherein the group message board is rendered in the user interface of the individual ones of the plurality of clients;
   determine that the text message in the group message board comprises positive feedback or negative feedback;
   calculate a media rating value for the current media content item from the media content items based at least in part on the positive feedback or the negative feedback received from the at least one of the plurality of clients, the media rating value representing an aggregate rating from the plurality of clients; and
   cause the media rating value for the current media content item to be rendered on the user interface.

2. The non-transitory computer-readable medium of claim 1, wherein the feedback further comprises a manipulation of a user interface component that initiates audio feedback that is superimposed over the current media content item during playback in substantially real-time.

3. The non-transitory computer-readable medium of claim 2, wherein the user interface component comprises a first user interface component, and when executed the program further causes the at least one computing device to at least:
   receive a mute interruption signal from one of the plurality of clients manipulating a second user interface component on the user interface; and
   disable the audio feedback from being superimposed over the current media content item for the one of the plurality of clients.

4. A system, comprising:
   at least one computing device comprising a processor and a memory; and
   an application executable in the at least one computing device, wherein the application, when executed, causes the at least one computing device to at least:
      serve a user interface associated with a play list of media content items to a plurality of clients, the user interface facilitating a client interaction with the application via a network, individual ones of the clients being associated with a corresponding one of a group of individuals;
      transmit a current media content item of the media content items in the play list from the application to the individual ones of the plurality of clients, the current media content item being transmitted for playback;
      receive feedback from at least one of the plurality of clients associated with the group of individuals during the playback of the current media content item in the individual ones of the plurality of clients, wherein the feedback comprises a text message on a group message board rendered on the user interface, the group message board displaying a plurality of messages transmitted from the individual ones of the plurality of clients, wherein the group message board is rendered in the user interface in the individual ones of the plurality of clients;
      determine that the text message in the group message board comprises positive feedback or negative feedback;
      calculate a media rating value for the current media content item from the media content items based at least in part on the positive feedback or the negative feedback received from the at least one of the plurality of clients, the media rating value representing an aggregate rating from the plurality of clients; and
      cause the media rating value for the current media content item to be rendered on the user interface.

5. The system of claim 4, wherein the feedback further comprises a manipulation of a user interface component that initiates audio feedback, the audio feedback comprising a predefined audio sound that is superimposed over the current media content item during playback.

6. The system of claim 4, wherein the feedback further comprises a manipulation of a user interface component that initiates recording audio feedback by one of the plurality of clients.

7. The system of claim 4, wherein the user interface comprises a user list of at least one of the media content items adjacent to the play list, and the play list is representative of a group play list for the plurality of clients.

8. The system of claim 4, wherein the feedback can comprise receiving a media content item approval signal transmitted by one of the plurality of clients in response to the one of the plurality of clients manipulating an approval user interface icon in the user interface.

9. A method, comprising:
   executing, by at least one computing device, an application that maintains a play list of media content items in association with a group of individuals;
   transmitting, by the at least one computing device, a current media content item of the media content items listed in the play list from the at least one computing device to a plurality of clients, individual ones of the plurality of clients being associated with a corresponding one of the individuals in the group, the current media content item being transmitted for playback on the individual ones of the plurality of clients;
   receiving, by the at least one computing device, feedback from at least one of the plurality of clients during the playback of the current media content item in the individual ones of the plurality of clients, the feedback comprising a text message on a group message board rendered on a user interface associated with plurality of clients, the group message board displaying a plurality of messages transmitted from the individual ones of the plurality of clients, wherein the group message board is rendered in the user interface in the individual ones of the plurality of client;
   determining, by the at least one computing device, that the text message in the group message board comprises positive feedback or negative feedback;
   calculating a media rating value for the current media content item from the media content items based at least in part on the positive feedback or the negative feedback received from the at least one of the plurality of clients, the media rating value representing an aggregate rating from the plurality of clients; and
   causing the media rating value for the current media content item to be rendered on the user interface.

10. The method of claim 9, further comprising serving, by the at least one computing device, the user interface to the individual ones of the plurality of clients, the user interface facilitating a client interaction with the application in the at least one computing device via a network.

11. The method of claim 9, further comprising updating, by the at least one computing device, an order of the media content items in the play list based at least in part on a recalculation of the media rating value for one of the media content items.

12. The method of claim 9, wherein the feedback comprises a predefined audio sound that is triggered from a manipulation of a user interface component rendered on one of the plurality of clients.

13. The method of claim 9, further comprising determining, by the at least one computing device, a priority of the individual ones of the media content items in the play list for transmitting based at least in part upon a plurality of media rating values.

14. The system of claim 7, wherein the application further causes the at least one computing device to at least receive a message indicating to include a selected media item from one of the plurality of clients into the group play list.

15. The system of claim 14, wherein the message is generated from the one of the plurality of clients by dragging and dropping the selected media item on the user interface from the user list to the group play list.

16. The system of claim 14, wherein the message is generated by selecting the selected media item from a search mechanism on the user interface.

17. The non-transitory computer-readable medium of claim 1, wherein the feedback comprises detecting a manipulation of at least one of an approval icon or a disapproval icon.

18. The non-transitory computer-readable medium of claim 1, wherein the program further causes the at least one computing device to at least:
   calculate a user submission score for a user of one of the plurality of clients based at least in part on the feedback that the user has received for at least one media content item that the user submitted to the play list; and
   cause the user submission score to be rendered on the user interface.

19. The non-transitory computer-readable medium of claim 1, wherein the program further causes the at least one computing device to at least:
   calculate a weighted portion of a user participation score for a user of one of the plurality of clients based at least in part on the feedback that the user has submitted with at least one media content item in the play list; and
   cause the user participation score to be rendered on the user interface.

20. The method of claim 9, wherein calculating the media rating value for the current media content item further comprises determining a weighting constant for a particular type of received feedback.

\* \* \* \* \*